Patented May 26, 1942

2,283,991

UNITED STATES PATENT OFFICE 2,283,991

SEPARATION OF SULPHURIC ACID FROM CARBOXYLIC ACIDS

William H. Hill, Stamford, Conn., assignor to American Cyanamid Company, New York, N. Y., a corporation of Maine No Drawing. Application November 25, 1939, Serial No. 306,198

12 Claims. (Cl. 260—540)

This invention relates to a process of purification and recovery of monocarboxylic acids, their anhydrides, and the anhydrides of dicarboxylic acids and ammonium salts thereof.

In the past, recovery and purification of monocarboxylic acids produced by oxidation processes in the presence of sulphuric acid and a catalyst have represented a considerable problem because the oxidation results in a mixture of the monocarboxylic acid, the excess sulphuric acid, and the catalytic material, etc. The separation of the monocarboxylic acid from the sulphuric acid has been a serious problem and has usually been effected by neutralization with a base which forms relatively insoluble sulphates such, for example, as alkaline earth metal hydroxides or carbonates. The monocarboxylic acids are then obtained in the form of soluble salts by adding sodium carbonate. These processes have produced waste sludges of alkaline earth metal sulphates and carbonates which have represented a loss and have increased the cost of recovery of monocarboxylic acids by reason of the fact that the process involves two different filtrations.

When an oxidation process employing sulphuric acid and a catalyst or sulphuric acid together with another oxidizing agent such as manganese dioxide or potassium permanganate are used to convert hydrocarbons or other organic compounds into monocarboxylic acids, there may be produced a mixture of mono- and poly-carboxylic acids which either results in an impure product or requires additional steps to separate the desired monocarboxylic acid.

According to the present invention monocarboxylic acids are separated from sulphuric acid and/or other polybasic acids by introducing the mixture into liquid ammonia or strong aqueous ammonia containing about 50% or more ammonia. The sulphuric acid reacts with the ammonia to form ammonium sulphate and the carboxylic acid to form the ammonium salt of the acid. Ammonium sulphate is insoluble in liquid or strong aqueous ammonia whereas the ammonium salt of the monocarboxylic acids are soluble. In the case where polycarboxylic acids are present also, their ammonium compounds are insoluble. A single filtration separates out the ammonium sulphate, an article of commerce instead of an industrial waste of calcium sulphate as calcium carbonate and the ammonium salt of the monocarboxylic acid free from contamination with polycarboxylic acids is easily recovered from the filtrate.

The present process is also applicable for the separation of anhydrides of monocarboxylic and dicarboxylic acids from polybasic acids in which case the mono- or dicarboxylic acid anhydrides react with the liquid ammonia or strong aqueous ammonia to form soluble ammonium salts and any free polybasic acids present form ammonium salts that are insoluble in the strong ammonia solution.

The anhydrides of monocarboxylic acids form ammonium salts that correspond to those of the underlying monocarboxylic acids and are likewise soluble in strong ammonia solution. The ammonium compounds of the anhydrides of dicarboxylic acids are also like those of the monocarboxylic acids and not like those of dicarboxylic acids, and therefore are soluble in strong ammonia solutions. For example, phthalic acid anhydride reacts with ammonia to form ammonium phthalamate in which there is only one —COONH$_4$ group, the other being a —CONH$_2$ group, and it is therefore similar to an ammonium compound of an amino monocarboxylic acid. On the other hand, ammonia reacts with phthalic acid to form diammonium phthalate, there being two —COONH$_4$ groups formed and such compounds are insoluble in strong ammonia solutions.

In some cases, liquid ammonia is not available as cheaply as is gaseous ammonia or aqueous ammonia solutions, and it is an advantage of the present invention that the ammonia does not have to be anhydrous in order to operate in the present process, because ammonium sulphate is relatively insoluble or even entirely insoluble in strong solutions of ammonia in water, depending on the ammonia concentration. Where, therefore, ammonia gas is available cheaply and liquid ammonia is relatively expensive an alternative method can be employed in which the crude oxidation mixture is dissolved in water and gaseous ammonia introduced under pressure until ammonium sulphate precipitates. This procedure can also be used where the ammonia gas is not pure, that is to say where it is contaminated with other waste gases or vapors which do not dissolve in water. In such cases the pressure may have to be increased in order to produce a sufficiently strong solution of ammonia in water so that ammonium sulphate will precipitate out. The strength of solution is not critical, and in general solutions having 50% or more of ammonia are effective in precipitating the ammonium sulphate.

A further alternative procedure is to neutralize the acidity of an acid oxidation mixture with gaseous ammonia without dissolving in water and after the whole of the oxidation mixture has been transformed into a solid or pasty mixture of ammonium salts it can be treated with either liquid ammonia or a strong ammonia solution in order to effect the separation. This two-step process has the advantage that the relatively large heat of neutralization is evolved in apparatus where liquid ammonia or strong aqueous ammonia solutions are not being handled, which apparatus can therefore be simpler in design and cheaper. An additional advantage resides in the fact that where the gas is contaminated with constituents which would tend to dissolve or condense when bubbled through an aqueous solution, they will not condense or dissolve if the oxidation mixture is treated without solution in water as it is possible to maintain the temperature above the point of condensation and the amount of water present below that at which any serious solution takes place. Particularly where, therefore, a rather strongly contaminated ammonia gas is available, this two-step process presents a considerable economic advantage.

The present invention is generally applicable to monocarboxylic acids, their anhydrides and anhydrides of dicarboxylic acids and is in no sense limited to those of a particular series. Thus, for example, it can be used to separate and purify monocarboxylic acids, their anhydrides and the anhydrides of dicarboxylic acids of the aliphatic series, compounds such as propionic, valeric, acrylic, amino acetic, glycollic, etc.; and of the aromatic series, compounds such as benzoic acid and the monocarboxylic acids of diphenyl, naphthalene, antracene, phenanthrene, and their dicarboxylic anhydrides such as phthalic anhydride; and also the heterocyclic series such as the monocarboxylic acids of pyridine, quinoline, including compounds such as nicotinic acid, picolinic acid, and quininic acid.

Monocarboxylic acids of the aromatic series have been prepared in the past by oxidizing the appropriate hydrocarbon using sulphuric acid and another oxidizing substance or sulphuric acid as a catalyst. For example, toluene may be oxidized by the use of sulphuric acid and manganese dioxide to give benzoic acid. More recently, sulphuric acid and manganese dioxide have been used successfully to oxidize compounds of the heterocyclic series to the corresponding monocarboxylic acids. For example, picolinic acid from alpha picoline or nicotinic acid from nicotine. In fact, the process is applicable in general to alkyl pyridines. The present invention when used in connection with these general processes removes the excess sulphuric acid as a valuable article of commerce, ammonium sulphate, and in addition is easier to carry out and less expensive than present methods.

Oxidation of aliphatic hydrocarbon and other compounds in the presence of sulphuric acid and a catalyst to produce monocarboxylic acids of the aliphatic series has not been in general use in the past. However, the present invention can be used very successfully to effect a separation when such an oxidation process is employed. The monobasic aliphatic acids are soluble in the strong ammonia solutions and separations have been effected from simple mixtures of such acids with sulphuric acid and also mixtures with other polybasic acids.

Monocarboxylic acids have also been prepared from polycarboxylic acids by splitting off of carboxylic groups by heating in the presence of a catalyst; for example, U. S. Patent No. 1,939,212 describes a process wherein a mixture of a polycarboxylic acid substance and a metal oxide is heated to produce monocarboxylic acids. The process is applicable to polycarboxylic acids generally and discloses phthalic, naphthalic, diphenic, maleic, fumaric, succinic, adipic and the like as being suitable examples. The present invention is useful in connection with such a process as it provides means to separate from the final reaction mixture the desired monocarboxylic acid and leave behind the unreacted polycarboxylic acid, the catalyst and other impurities.

Monocarboxylic acids have also been prepared by hydrolyzing nitriles with sulphuric acid, for example acetone cyanohydrin can be converted into alpha hydroxy isobutyric acid using sulphric acid as the hydrolizing agent. The excess sulphuric acid can be separated from the monocarboxylic acid by the improved method of this invention.

The invention will be illustrated in greater detail by the following specific examples. It should be understood, however, that these examples are given primarily for purposes of illustration and the invention in its broader aspects is not limited thereto.

*Example 1*

A crude oxidation mixture resulting from the treatment of toluene with a sulphuric acid solution of chromic acid and containing among other things benzoic acid and the excess sulphuric acid along with dark colored impurities was introduced into liquid ammonia in the ratio of between 3 and 4 parts of liquid ammonia to 1 part of the oxidation mixture. The mixture was stirred for about an hour, and filtered. The filter cake was suspended in more liquid ammonia and again filtered. Upon evaporation of the ammonia from the combined filtrates there was obtained a pure ammonium benzoate representing over 96% of benzoic acid in the oxidation mixture.

*Example 2*

A crude oxidation mixture containing potassium permanganate, manganese oxides, manganese sulphate, sulphric acid, potassium sulphate, quinoline and quinolinic acid was treated as described in Example 1. The quinolinic acid ammonium salt was recovered free from contamination after evaporation of ammonia and quinoline from the filtrates.

*Example 3*

A crude oxidation mixture resulting from the treatment of naphthalene with fuming sulphuric acid and a mercury catalyst and containing among other things phthalic anhydride and the excess sulphuric acid was treated as described in Example 1. The ammonium salt of phthalamic acid in a very pure form was obtained from the filtrate.

*Example 4*

A crude oxidation mixture resulting from the treatment of a solution of alpha picoline with sulphuric acid, manganese oxides and containing among other things picolinic acid and the excess sulphuric acid was treated as described in Example 1. A good yield of a pure picolinic acid ammonium salt was obtained from the filtrate.

Example 5

A crude oxidation mixture resulting from the treatment of nicotine with a sulphuric acid solution of potassium dichromate and containing among other things nicotinic acid and the excess sulphuric acid was treated as described in Example 1. The nicotinic acid ammonium salt in a pure form was recovered from the filtrate.

Example 6

A decarboxylation mixture containing phthalic acid and benzoic acid was treated as described in Example 1. Pure ammonium benzoate was recovered from the filtrate and the phthalic acid remained in the filter cake as ammonium phthalate.

Example 7

The mixtures described in Examples 1-6 inclusive were each subjected to the following treatment:

The mixtures were diluted with water, 3 parts of water being used for one part of mixture. Ammonia gas was passed into this solution under pressure until the ammonia concentration of the solution reached approximately 50%. The solutions were then filtered.

The products obtained from the filtrate were about equal in both quality and quantity to those obtained using liquid ammonia.

Example 8

One mol. (two equivalents) of sulphuric acid was slowly added to one mol. of acetone cyanohydrin, keeping the temperature of the mixture at 35° C. After complete addition of the acid and two mols. of water, the temperature was raised to 80°-90° C. and maintained at that temperature for one hour and then about four mols. of water were added and the mixture heated for four hours. To produce a hydrolysis mixture containing sulphuric acid, ammonium sulphate and alpha hydroxy isobutyric acid, the final hydrolysis mixture was added to liquid ammonia and the mixture treated as in Example 1. From the filtrate there was obtained the ammonium salt of alpha hydroxy isobutyric acid.

What I claim is:

1. A method of separating a substance selected from the group consisting of monocarboxylic acids, monocarboxylic acid anhydrides, and dicarboxylic acid anhydrides from a mixture containing at least one polybasic inorganic acid which comprises subjecting said mixture to the action of a substance included in the group consisting of liquid ammonia and ammonia water solutions in which the water content is less than 50% in sufficient amount to dissolve the ammonium compound of the substance of the group consisting of monocarboxylic acids, monocarboxylic acid anhydrides, and dicarboxylic acid anhydrides, filtering and separating from the mixture.

2. A method of separating substances selected from the group consisting of monocarboxylic acids, monocarboxylic acid anhydrides and dicarboxylic acid anhydrides from a mixture with sulphuric acid, which comprises subjecting the mixture to the action of a substance included in the group consisting of liquid ammonia and ammonia water solutions in which the water content is less than 50% in sufficient amount to dissolve the ammonium compound of the substance of the group consisting of monocarboxylic acids, monocarboxylic acid anhydrides and dicarboxylic acid anhydrides, filtering and separating from the filtrate.

3. A method of separating a substance selected from the group consisting of monocarboxylic acids, monocarboxylic acid anhydrides, and dicarboxylic acid anhydrides from a mixture containing at least one polybasic inorganic acid which comprises subjecting said mixture to the action of liquid ammonia in sufficient amount to dissolve the ammonium compound of the substance of the group consisting of monocarboxylic acids, monocarboxylic acid anhydrides, and dicarboxylic acid anhydrides, filtering and separating from the mixture.

4. A method of separating substances selected from the group consisting of monocarboxylic acids, monocarboxylic acid anhydrides and dicarboxylic acid anhydrides from a mixture containing sulphuric acid, which comprises subjecting the mixture to the action of liquid ammonia in sufficient amount to dissolve the substance of the group consisting of monocarboxylic acids, monocarboxylic acid anhydrides and dicarboxylic acid anhydrides, filtering and separating from the filtrate.

5. A method of separating the ammonium salts of compounds selected from the group consisting of monocarboxylic acids, monocarboxylic acid anhydrides and dicarboxylic acid anhydrides from a mixture containing at least one ammonium salt of a polybasic inorganic acid which comprises subjecting said mixture to the action of a substance included in the group consisting of liquid ammonia and ammonia water solutions in which the water content is less than 50% in sufficient amount to dissolve the ammonium salts of the compounds of the group consisting of monocarboxylic acids, monocarboxylic acid anhydrides and dicarboxylic acid anhydrides.

6. A method of separating the ammonium salts of compounds selected from the group consisting of monocarboxylic acids, monocarboxylic acid anhydrides and dicarboxylic acid anhydrides from a mixture containing at least one ammonium salt of a polybasic inorganic acid which comprises subjecting said mixture to the action of liquid ammonia in sufficient amount to dissolve the ammonium salts of the compounds of the group consisting of monocarboxylic acids, monocarboxylic acid anhydrides and dicarboxylic acid anhydrides.

7. A method of separating a substance selected from the group consisting of aliphatic monocarboxylic acids, aliphatic monocarboxylic acid anhydrides and aliphatic dicarboxylic acid anhydrides from a mixture containing at least one polybasic inorganic acid which comprises subjecting said mixture to the action of a substance included in the group consisting of liquid ammonia and ammonia water solutions in which the water content is less than 50% in sufficient amount to dissolve the ammonium compound of the group consisting of aliphatic monocarboxylic acids, aliphatic monocarboxylic acid anhydrides and aliphatic dicarboxylic anhydrides, filtering and separating from the mixture.

8. A method of separating a substance selected from the group consisting of aliphatic monocarboxylic acids, aliphatic monocarboxylic acid anhydrides, and aliphatic dicarboxylic acid anhydrides from a mixture containing at least one polybasic inorganic acid which comprises subjecting said mixture to the action of liquid ammonia in sufficient amount to dissolve the ammonium compound of the group consisting of aliphatic monocarboxylic acids, aliphatic monocarboxylic acid anhydrides and aliphatic dicarboxylic anhydrides, filtering and separating from the mixture.

9. A method of separating a substance selected from the group consisting of aromatic monocarboxylic acids, aromatic monocarboxylic acid anhydrides, and aromatic dicarboxylic acid anhydrides from a mixture containing at least one polybasic inorganic acid which comprises subjecting said mixture to the action of a substance included in the group consisting of liquid ammonia and ammonia water solutions in which the water content is less than 50% in sufficient amount to dissolve the ammonium compound of the group consisting of aromatic monocarboxylic acids, aromatic monocarboxylic acid anhydrides, and aromatic dicarboxylic anhydrides, filtering and separating the mixture.

10. A method of separating a substance selected from the group consisting of aromatic monocarboxylic acids, aromatic monocarboxylic acid anhydrides, and aromatic dicarboxylic acid anhydrides from a mixture containing at least one polybasic inorganic acid which comprises subjecting said mixture to the action of liquid ammonia in sufficient amount to dissolve the ammonium compound of the group consisting of aromatic monocarboxylic acids, aromatic monocarboxylic acid anhydrides, and aromatic dicarboxylic anhydrides, filtering and separating from the mixture.

11. A method of separating a substance selected from the group consisting of heterocyclic monocarboxylic acids, heterocyclic monocarboxylic acid anhydrides, and heterocyclic dicarboxylic acid anhydrides from a mixture containing at least one polybasic inorganic acid which comprises subjecting said mixture to the action of a substance included in the group consisting of liquid ammonia and ammonia water solutions in which the water content is less than 50% in sufficient amount to dissolve the ammonium compound of the group consisting of heterocyclic monocarboxylic acids, heterocyclic monocarboxylic acid anhydrides, and heterocyclic dicarboxylic anhydrides, filtering and separating from the mixture.

12. A method of separating a substance selected from the group consisting of heterocyclic monocarboxylic acids, heterocyclic monocarboxylic acid anhydrides, and heterocyclic dicarboxylic acid anhydrides from a mixture containing at least one polybasic inorganic acid which comprises subjecting said mixture to the action of liquid ammonia in sufficient amount to dissolve the ammonium compound of the group consisting of heterocyclic monocarboxylic acids, heterocyclic monocarboxylic acid anhydrides, and heterocyclic dicarboxylic anhydrides, filtering and separating from the mixture.

WILLIAM H. HILL.